United States Patent
Dasgupta et al.

(10) Patent No.: US 7,701,930 B2
(45) Date of Patent: Apr. 20, 2010

(54) TECHNIQUE FOR PROVIDING VIRTUAL N-WAY VIDEO CONFERENCING TO IP VIDEOPHONES

(75) Inventors: Sattam Dasgupta, Karnataka (IN); Anil Kumar Agara Venkatesha Rao, Karnataka (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 1161 days.

(21) Appl. No.: 11/257,744

(22) Filed: Oct. 25, 2005

(65) Prior Publication Data

US 2007/0115948 A1 May 24, 2007

(51) Int. Cl.
*H04L 12/66* (2006.01)

(52) U.S. Cl. ............... 370/356; 348/14.01; 348/14.03; 348/14.1; 348/14.16; 370/259; 382/103; 709/204; 709/231

(58) Field of Classification Search ......... 370/260–269, 370/259, 356; 379/93.21, 158, 202.001–206.01; 348/14.07–14.1, 14.01, 14.03, 14.16; 382/103; 709/204, 231
See application file for complete search history.

(56) References Cited

U.S. PATENT DOCUMENTS

| | | | | |
|---|---|---|---|---|
| 5,999,207 A * | 12/1999 | Rodriguez et al. | ....... | 348/14.03 |
| 6,201,562 B1 * | 3/2001 | Lor | ............ | 348/14.01 |
| 6,757,259 B1 * | 6/2004 | Hamilton | ............ | 370/260 |
| 6,774,927 B1 * | 8/2004 | Cohen et al. | ............ | 348/14.1 |
| 7,116,349 B1 * | 10/2006 | Yang et al. | ............ | 348/14.01 |
| 7,239,338 B2 * | 7/2007 | Krisbergh et al. | ......... | 348/14.01 |
| 7,287,053 B2 * | 10/2007 | Bodin | ............ | 709/204 |
| 7,321,384 B1 * | 1/2008 | Wu et al. | ............ | 348/14.08 |
| 7,404,001 B2 * | 7/2008 | Campbell et al. | ............ | 709/231 |
| 7,605,837 B2 * | 10/2009 | Yuen et al. | ............ | 348/14.16 |
| 2003/0149724 A1 * | 8/2003 | Chang | ............ | 709/204 |
| 2003/0214573 A1 * | 11/2003 | Oh | ............ | 348/14.01 |
| 2005/0157164 A1 * | 7/2005 | Eshkoli et al. | ............ | 348/14.07 |
| 2006/0120307 A1 * | 6/2006 | Sahashi | ............ | 370/259 |
| 2006/0182311 A1 * | 8/2006 | Lev | ............ | 382/103 |

* cited by examiner

*Primary Examiner*—Gerald Gauthier
(74) *Attorney, Agent, or Firm*—Prakash Nama; Global IP Services, PLLC

(57) ABSTRACT

A technique and method provide virtual N-way video conferencing to participants having IP stations/videophones, which have limited processing capacity, by auto-selecting a limited subset of the participants for video display and restricting the rest of the participants to voice-only mode which requires reduced processing capability. The method uses a virtual n-way conferencing module (VNCM) to provide the video conferencing, and an auto caller select module (ACSM) for causing selective video display. Some of the participants might have VoIP terminals instead of IP videophones. The invention includes a technique, e.g., by using a video transmission control module (VTCM) for reducing the bandwidth requirement of IP videophones by signaling the participants in voice-only mode not to transmit the video information in bandwidth-constrained situations. Also taught herein is an article comprising a storage medium having instructions thereon which when executed by a computing platform will result in execution of the method.

27 Claims, 3 Drawing Sheets excellent # TECHNIQUE FOR PROVIDING VIRTUAL N-WAY VIDEO CONFERENCING TO IP VIDEOPHONES

FIELD OF THE INVENTION

This invention generally relates to the field of video conferencing and more specifically to a technique for providing N-way Video Conferencing (NVC) to IP (Internet Protocol) videophones and voice over IP (VoIP) phones.

BACKGROUND OF THE INVENTION

Video conferencing is a powerful tool for communication and collaboration and helps improve productivity and reduce costs for global companies. Video conferencing facilitates voice-visual communication between geographically distributed teams in organizations.

With the rapid growth of packet-based IP infrastructure, IP-based video conferencing is gaining prominence. Deployment of IP-based video conferencing provides numerous advantages such as lower cost, easier access, rich media integration, network convergence and web-collaboration capabilities.

For purposes of this invention, users or subscribers at different sites who participate in video conferencing through IP videophones or voice over IP phones are referred to as endpoints or participants. The number of endpoints in an IP-based video conferencing system is constrained primarily by two factors. The first is the bandwidth of the communication link between the sites. The second is the processing capability of the endpoint at each site. The latter is dictated by the installed processor capacity in these endpoints, which limits the number of simultaneous video and voice channels that can be processed. Typically, video processing requires significantly higher processing power, which limits the number of possible simultaneous video channels as compared to the number of simultaneous voice channels.

In available prior art, IP-based video conferencing is facilitated by a service provider or a centralized server and may be a managed service that can be prohibitively expensive for private users and small enterprises.

SUMMARY OF THE INVENTION

The present invention provides a Virtual n-way Video Conference (VNVC) capability to IP videophones which otherwise cannot support multi-way conferencing. The invention provides video conferencing capability to an IP videophone which otherwise cannot support the multi-way conferencing feature because of its limited processing capability. In one form, this may be achieved by modifying at least one IP videophone to automatically select, based on defined selection criteria, the number of endpoint(s) for simultaneous decode and display which it is capable of supporting. For the remaining participating videophones, the modified IP videophone only decodes the voice. The term "endpoint" herein refers to the IP videophone or VoIP phone used by a participant taking part in the video conference. This way, even an IP videophone with the capability of displaying only one video channel can achieve virtual multi-way conferencing through manual or auto-selection of channels, thus giving the user the ability to visually interact with all the locations that have IP videophone capability. With a plurality of modified IP video phones being deployed for video conferencing in the invention, it is possible to reduce the bandwidth required for the video conferencing by switching off video transmission from certain modified IP videophones by selectively placing them in the voice-only mode. By the use of the invention, with an IP videophone which has a limited processing power, it is possible for more endpoints to participate in the video conferencing than would otherwise have been possible. In some embodiments, the technique provides an option for selectively displaying only the current speaker, or for viewing the current speaker along with a specific number of previous speakers, or a specific number of designated speakers, or any such combination. In addition, the number of participants that the modified IP videophone can support in a video conference situation can be increased beyond an apparent processing power in the modified videophone, by switching the participants who are not being displayed to voice-only mode. Since voice requires reduced processing, more participants in the video conferencing can be accommodated for a given processing capacity of the IP videophone.

Typically, IP videophones have a specific processing power. This determines the number of simultaneous videos displayed and hence the number of endpoints that can actively participate in the conference.

One embodiment resides in a method of providing virtual multi-station video conferencing capability to an IP videophone, comprising the steps of: modifying at least a first IP videophone by providing a virtual n-way conference module (VNCM) in said at least first IP videophone, wherein said VNCM is configured for enabling virtual n-way conference capability to said first IP videophone by connecting 'n' IP videophones selected from said plurality of IP videophones, and for displaying selected participants on said 'n' IP videophones while decoding only the voice signal for the remaining IP videophones, said VNCM being able to select participants for display, based on defined selection criteria. Advantageously, an Auto Caller Select Module (ACSM) cooperating with said VNCM may be used for performing the step of selection. The selection criteria might include a consideration of which participant is speaking at any given time. The method might further include, for conserving bandwidth requirements, the step of inhibiting the voice-only mode IP videophones from transmitting video information to one or more receiving devices. To this end, a Video Transmission Control Module (VTCM) may be provided in the VNCM of the transmitting phones.

A second embodiment resides in modified IP videophones for use by participants for providing virtual multi-station video conferencing for participants at 'n' IP videophones selected from a plurality of IP videophones located at different sites, each modified IP videophone having a VNCM configured for connecting said 'n' IP stations/videophones for video conferencing, the VNCM including an ACSM configured for providing video display information to selected ones of the 'n' IP videophones/stations, said ACSM being responsive to predefined selection criteria, wherein the VNCM is provided inside of at least one of said IP videophones with known processing capacity.

Some embodiments also provide for significantly reducing the bandwidth requirement of the modified IP videophone group by signaling the modified IP videophone endpoints in voice-only mode not to transmit video information to the modified IP videophones or receiving devices including other endpoints.

Also taught herein is an article comprising a storage medium having instructions thereon which when executed by a computing platform result in execution of a method as recited above.

BRIEF DESCRIPTION OF THE DRAWING

A more detailed understanding of the invention may be had from the following description of embodiments, to be understood in conjunction with the accompanying drawings wherein.

DETAILED DESCRIPTION OF EMBODIMENTS

In the following detailed description of the various embodiments of the invention, reference is made to the accompanying drawings that form a part hereof, and in which are shown by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is therefore not to be taken in a limiting sense, and the scope of the present invention is defined only by the appended claims and their equivalents.

Described hereinafter is an exemplary scheme for providing virtual n-way video conferencing capability to IP videophones which have limited processing capability. The term "endpoint" refers to the IP videophone participating in the video conference. In some cases it can also refer to a voice over IP (VoIP) phone. The proposed technique provides virtual n-way video conferencing to IP videophones, which may have limited video channel display capability, by automatically selecting the endpoints to be displayed. The remaining endpoints i.e., the ones that are not being displayed at any given point of time can remain in the voice-only mode of participation. This way, even an IP videophone with the capability of displaying only one video channel can achieve virtual multi-way conferencing through manual or auto-selection of channels which gives the user the ability to visually interact with all the locations that have IP videophone capability. Some embodiments provide an option for selecting only one participant, or for viewing the current speaker along with a specific number of previous speakers or a specific number of designated speakers, or any other combination.

Figure 1:
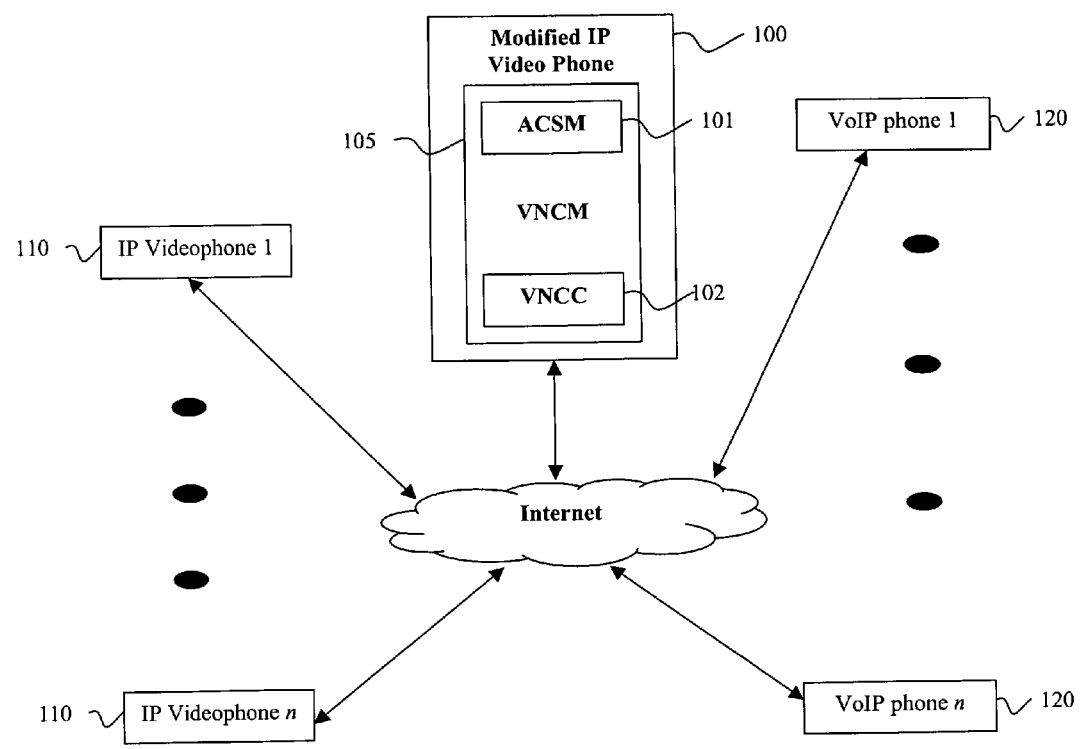
FIG. 1 shows an exemplary n-way IP-based video conferencing set-up provided by a modified IP videophone.

FIG. 1 shows one embodiment of the virtual n-way video conference scheme, wherein a modified IP videophone 100 includes a virtual n-way conferencing module (VNCM) 105. The VNCM 105 contains the auto caller select module (ACSM) 101, which is configured to select one or more endpoints to be displayed based on a defined selection criterion. The selection may be based on voice activity i.e., based on who is speaking at a given point of time. Other selection criteria are conceivable and are within the ambit of the invention. The ACSM may be a module that detects a participant user's speech and switches the video display to display that user. The VNCM displays the selected endpoint and retains the other endpoints in the voice-only mode. Depending on the capacity of the phone, the last speaker or speakers can also be displayed. As shown in FIG. 1, the modified IP phone includes a VNC controller VNCC (102 in FIG. 1), that controls the VNCM information.

Further, as shown in FIG. 1, the video conference connects a plurality of IP videophones 110 and VoIP phones 120. The above mentioned modification in the IP videophone is not essential on any of the other IP videophones participating in the conference unless the corresponding participants desire virtual n-way conferencing on their phones. In some embodiments, all or a specified subset of the other IP videophones can include a VNCM 105 if the participants desire virtual n-way video conferencing to be implemented on their respective IP videophones.

Additionally, the number of participants in the IP-based video conference that can be supported by an endpoint IP videophone can be increased beyond the processing capacity in that endpoint for simultaneous conferencing by switching the endpoints which are not selected for video decode and display, to voice-only mode. Since 'voice-only participation' requires reduced processing compared to video processing, more endpoints in the voice-only mode can be accommodated for a given processing capacity of the IP videophone.

A modification of the proposed invention is implemented in a situation where the bandwidth of the communication link is limited. Signaling the endpoints which are in voice-only mode not to transmit the video information to one or more receiving devices at other endpoints can significantly reduce the bandwidth requirement of the IP videophone.

Figure 2:
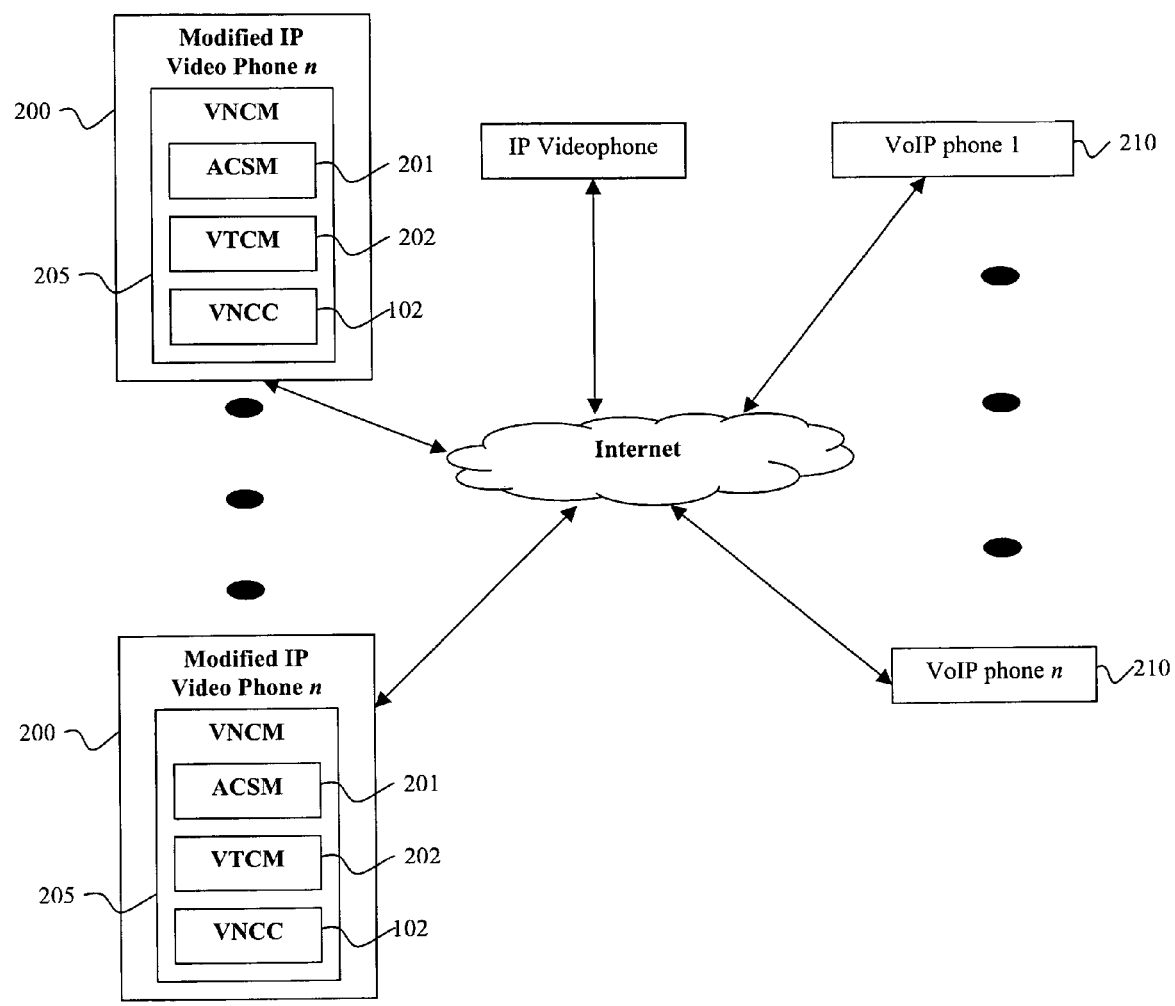
FIG. 2 illustrates an exemplary set-up for bandwidth reduction in an IP-based video conference; and, FIG. 3 illustrates a general purpose computing platform which may be used in practicing the invention.

FIG. 2 shows the plurality of modified IP videophones 200 participating in an IP-based video conference. The modified IP videophone 200 contains a VNCM 205 that includes ACSM 201 and Video Transmission Control Module (VTCM) 202. The VTCM 202 of the transmitting phones is configured to recognize the stop-video-transmit signal from the VTCM of another modified IP videophone and shuts down video transmission to the receiving device. Further as the figure shows, a plurality of VoIP phones 210 connected to the internet can also participate in the IP-based video conference. Illustrated in FIG. 2 is a generic IP videophone which is unmodified and may be similar to equipment that may be commercially bought. The unmodified IP videophone is connected to the internet but does not include the VNCM enhancement or other modules. There may be a plurality of the unmodified generic IP videophones connected to the internet. Even though FIG. 2 does not specifically illustrate a controller VNCC, it is envisaged that a VNCC can be included within the module VNCM in FIG. 2, to interact with VNCM and the other modules. Exemplary specific details of the functioning of VNCC and other modules are given hereinafter.

The aforementioned technique addresses the processor limitation of the existing IP videophone technology and successfully allows a modified IP videophone with limited video channel display capability to participate in an IP-based video conference with multiple IP videophones, and also enables visual communication with all of them, based on specified selection criteria. The proposed invention also achieves conferencing among a larger number of endpoints by auto-selecting a limited subset of endpoints for video and restricting the rest of the endpoints to voice-only mode which requires lesser processing capability. Additionally, when the bandwidth of the communication link is limited, a significant reduction in the bandwidth requirement of the IP videophone can be achieved by the method described hereinabove.

Details of exemplary functioning and configurations of the modules ACSM (101 in FIG. 1, 201 in FIG. 2), VNCC (102 in FIG. 1), VNCM (105 in FIG. 1, 205 in FIG. 2) and VTCM (202 in FIG. 2) as applied to Virtual N-way Video Conferencing (VNCM) are as follows:

ACSM—The Auto Caller Select Module takes input from the user of the modified video phone using the selection parameters and selection criteria. It monitors all the endpoints, and based on the selection parameters, selects one or more active endpoints (selected endpoint SEP) and passes the information to the VNCM controller (VNCC).

In one embodiment, the selection criterion or parameter may be the specific endpoints that the user wants to be decoded and displayed, or the number of endpoints which were active (i.e., the participants were speaking for example) just before the currently active one, who the user wants to be decoded and displayed or a combination of the two. The selection criterion may also comprise the duration which an endpoint should be active for the ACSM to select the participant as the active speaker to be displayed.

VNCC—The inputs to this VNCM Controller include a list of endpoints connected in the video conference; the endpoint(s) that should be decoded and displayed coming from the ACSM. Based on the two sets of inputs, the VNCC identifies the connected IP video phones whose video signals have not been selected for decoding and display, or rejected endpoints (REP). VNCC instructs the video decoding and display function in the video phone which may or may not be part of VNCM to decode-display specific endpoints and not decode-display the others. It also passes the list of REPs not to be decoded to the Video Transmission Control Module (VTCM) which is described next.

The VTCM receives instructions from the other participating modified IP video phones through the signaling protocol when the phone in which it resides is part of the transmitting endpoints' REP. It then instructs the video transmission module of the video phone not to transmit to the endpoints listed in REP. It also receives the REP from VNCC of the phone in which it resides and instructs through the signaling protocol to the VTCM of the endpoints listed in the REP not to transmit video information to the phone it resides in.

The above description of the configurations of the modules VNCM, ACSM, VNCC and VTCM is given by way of example only. The configurations may be modified as necessary and suitable, for implementation in the present invention.

The salient features of the technique described above include the following:

The invention will allow a video-phone which is either incapable of or has limited capability in video conferencing (because of its limited processing power) to be modified with enhancements, enabling it to participate in video conferencing.

Even for a video phone which has a certain known video conferencing capability (in terms of number of participants), the invention will allow more endpoints to participate in the video conference than is otherwise possible.

The inventive technique enables reducing the bandwidth required for the video conference by switching off video transmission from modified phones which are in voice-only mode.

The foregoing describes exemplary embodiments for providing virtual n-way video conferencing to IP videophones with limited video channel display capability using the scheme taught herein. Also included in the scope of the invention is an article comprising a storage medium having instructions thereon which when executed by a computing platform will result in execution of a method recited and described hereinabove. It is understood that modifications in the method, apparatus and article featured above may be made without departing from the thrust of the invention. All such modifications are envisaged to be within the ambit of the invention.

Figure 3:
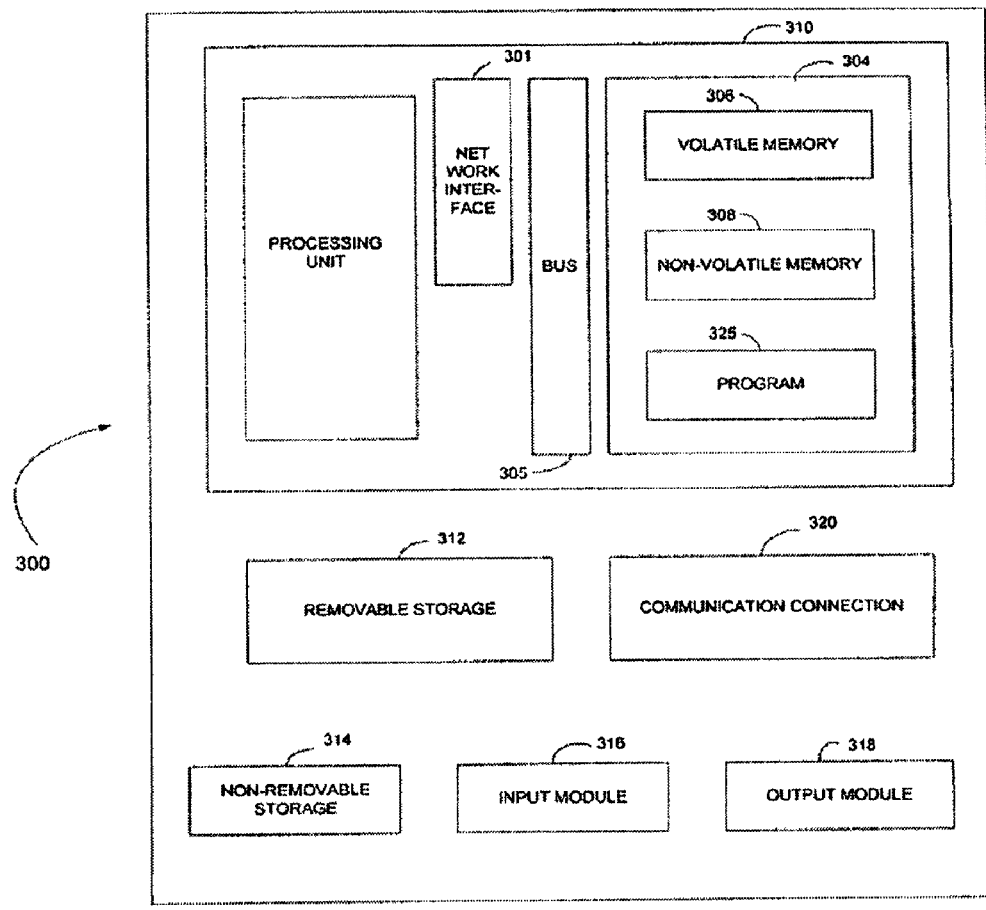

A general purpose computing platform may be deployed to implement the method described hereinabove. FIG. 3 shows an example of a suitable computing system environment for implementing embodiments of the present subject matter. FIG. 3 and the following discussion are intended to provide a brief, general description of a suitable computing environment in which certain embodiments of the inventive concepts contained herein may be implemented, and also for the purposes of participant selection and interaction among the modules VNCM, VNCC, ACSM, and VTCM. These modules may be software based modules or may be a combination of software and some hardware.

A general purpose computing platform 300 may comprise a computing device in the form of a computer 310 which may include a processing unit 302, memory 304, removable storage 312, and non-removable storage 314. Computer 310 additionally includes a bus 305 and a network interface 301. Computer 310 may include or have access to a computing environment that includes one or more user input modules/devices 316, one or more output modules or devices 318, and one or more communication connections 320 such as a network interface card or a USB connection. One or more user input devices 316 can be a touch screen and a stylus or the like. The one or more output devices 318 can be a display device of computer, computer monitor, TV screen, plasma display, LCD display, display on a touch screen, display on an electronic tablet, or the like. The computer 310 may operate in a networked environment using the communication connection 320 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 304 may include volatile memory 306 and non-volatile memory 308. A variety of computer-readable media may be stored in and accessed from the memory elements of computer 310, such as volatile memory 306 and non-volatile memory 308, removable storage 312 and non-removable storage 314. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like, chemical storage, biological storage, and other types of data storage.

"Processor" or "processing unit" as used herein, means any type of computational circuit, such as, but not limited to a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 302 of the computer 310. For example, a computer program 325 may include machine-readable instructions capable of providing virtual n-way video conferencing to IP videophones according to the teachings of the described embodiments of the present subject matter. In one embodiment, the computer program 325 may be included on a CD-ROM and loaded from the CD-ROM to a hard drive in non-volatile memory 308. The machine-readable instructions cause the computer 310 to decode according to the various embodiments of the present subject matter.

It is to be noted that FIGS. 1-3 herein are merely representational and are not drawn to scale. Certain portions thereof may be exaggerated, while others may be minimized. FIGS. 1-3 relate to various embodiments of the subject matter that can be understood and appropriately carried out by those of ordinary skill in the art.

The above-described technique provides various embodiments for providing virtual n-way video conferencing to participants with IP videophones and/or VoIP phones. It is to be understood that the above-description is intended to be illustrative, and not restrictive. Many other embodiments within the ambit of the invention will be apparent to those skilled in the art upon reviewing the above-description. The scope of the subject matter of the present invention should therefore be determined with reference to the following claims, along with the full scope of equivalents to which such claims are entitled.

The invention claimed is:

1. A method of providing virtual multi-station video conferencing, comprising the steps of:
   connecting a plurality of IP videophones located at different sites for video conferencing, wherein said plurality of IP videophones includes a first IP videophone having limited number of video channels decode and display capability, wherein said first IP videophone includes a virtual n-way conference module (VNCM), and wherein said VNCM is configured for enabling virtual multi-way conference capability to said first IP videophone;
   decoding and displaying video, on said first IP videophone, from one or more IP videophones selected from said plurality of IP videophones, wherein said VNCM being able to select one or more IP videophones for video decode and display, based on defined selection criteria; and
   decoding voice, on said first IP videophone, for remaining IP videophones in said plurality of IP videophones for which video is not being decoded and displayed.

2. The method as in claim 1, further comprising providing an auto caller select module (ACSM) cooperating with said VNCM for performing the step of displaying.

3. The method as in claim 2, further comprising placing said ACSM within said first modified IP videophone.

4. The method as in claim 3, further comprising making said ACSM as part of said VNCM.

5. The method as in claim 1, wherein said selection criteria include a consideration of who is speaking at a given point in time.

6. The method as in claim 5 further comprising choosing to display a selected previous speaker in the video conferencing.

7. The method as in claim 5 wherein a processing power within each of the modified IP videophones is known, the method further modifying additional selected IP videophones similar to said first modified IP videophone, and limiting processor use as desired, by placing chosen modified IP videophones in voice-only mode.

8. The method as in claim 7, further comprising limiting selection of those IP videophones which are to be modified, to participants who need a video display, and controlling participants who do not need video display to participate in voice-only mode.

9. The method as in claim 8, further comprising withholding transmission of video information from those participants who should be in voice-only mode, to conserve band width requirements.

10. The method as in claim 9, further comprising providing a video transmission control module (VTCM) in a transmitting IP videophone to effect selective non-transmission of video information to participants who are in voice-only mode, and providing a VNCM controller (VNCC) for selectively identifying connected IP videophones whose video signals have not been selected for decoding and display, and for providing to the VTCM a list of rejected endpoints not to be decoded.

11. A system for providing virtual multi-station video conferencing, comprising:
   a plurality of IP videophones located at different sites connected in video conferencing, wherein said plurality of IP videophones includes a first IP videophone having limited number of video channels decode and display capability; and
   a virtual n-way conference module (VNCM) residing inside said first IP videophone for enabling virtual multi-way conference capability to said first IP videophone, wherein said VNCM comprises:
      an auto caller select module (ACSM) for selecting one or more IP videophones to decode and display video on said first IP videophone, based on defined selection criteria;
      a VNCM controller (VNCC) for controlling VNCM information of decoding and displaying video, on said first IP videophone, from said selected one or more IP videophones in said plurality of IP videophones; and
      a video transmission control module (VTCM) for transmitting and recognizing a 'stop-video-transmit signal' for remaining IP videophones in said plurality of IP videophones for which video is not being decoded and displayed and shutting down video transmission to said first IP videophone, wherein said first IP videophone only decodes voice for said remaining IP videophones for which said 'stop-video-transmit signal' is recognized.

12. The system as in claim 11, wherein said selection criteria are based on voice activity of said participants, and wherein said system interacts with internet and includes at least one IP videophone which is modified by inclusion of said VNCM, and at least one generic unmodified IP videophone also connected to the internet.

13. The system as in claim 12, wherein said selection criteria include presence of speech of a participant who is speaking at a given time in the video conferencing.

14. The system as in claim 12, wherein said VNCM and ACSM are located in a modified IP videophone configured to interact with a plurality of IP stations/videophones.

15. The system as in claim 11, wherein said VNCM is provided to modify a one or more IP videophones selected from said plurality of IP videophones.

16. The system as in claim 15, wherein said VNCM is provided inside of said modified IP videophone which has a known processing capacity.

17. The system as in claim 16, wherein said at least first one modified IP videophone includes said VTCM to effect selective non-transmission of video information to participants who need not display video information but can participate in voice-only mode, said apparatus including said VNCC for selectively identifying connected IP videophones whose video signals have not been selected for decoding and display, and for providing to said VTCM a list of rejected endpoints not to be decoded.

18. The system as in claim 16, wherein said modified IP videophone is configured by inclusion of said VNCM and ACSM to interact with said VTCM.

19. The system as in claim 18, including additional modified IP videophones, each with inclusion of said VNCC, ACSM, and VTCM, said system being configured such that a speaking participant is selectively able to limit processor use in chosen modified IP videophones as desired, by placing said chosen modified IP videophones in voice-only mode.

20. The system as in claim 16, wherein at least some of said IP stations/videophones are VoIP phones.

21. A modified IP videophone for use by a participant for achieving virtual multi-station video conferencing, wherein said modified IP videophone having limited number of video channels decode and display capability, comprising:
   a virtual n-way conferencing module (VNCM) configured for connecting said modified IP videophone to a plurality of IP stations/videophones located at different sites for video conferencing, wherein said VNCM is configured for enabling virtual multi-way conference capability to said modified IP videophone, and wherein said VNCM comprises:
      an auto caller select module (ACSM) for selecting one or more IP videophones to decode and display video on said modified IP videophone, based on defined selection criteria;
      a VNCM controller (VNCC) for controlling said VNCM information of decoding and displaying video, on said modified IP videophone, from said selected one or more IP videophones in said plurality of IP videophones; and
      a video transmission control module (VTCM) for transmitting and recognizing a 'stop-video-transmit signal' for remaining IP videophones in said plurality of IP videophones for which video is not being decoded and displayed and shutting down video transmission to said modified IP videophone, wherein said modified IP videophone only decodes voice for said remaining IP videophones for which said 'stop-video-transmit signal' is recognized.

22. A modified IP videophone as in claim 21, wherein said VTCM to effect selective non-transmission of video information to participants who need not display video information but can participate in the video conferencing in voice-only mode, said modified videophone including said VNCC for selectively identifying connected IP videophones whose video signals have not been selected for decoding and display, and for providing to said VTCM a list of rejected endpoints not to be decoded.

23. An article comprising a storage medium having instructions thereon which when executed by a computing platform result in execution of a method of providing virtual multi-station video conferencing, comprising the steps of:
   connecting a plurality of IP videophones located at different sites for video conferencing, wherein said plurality of IP videophones includes a first IP videophone having limited number of video channels decode and display capability, wherein said first IP videophone includes a virtual n-way conference module (VNCM), and wherein said VNCM is configured for enabling virtual multi-way conference capability to said first IP videophone;
   decoding and displaying video, on said first IP videophone, from one or more IP videophones selected from said plurality of IP videophones, wherein said VNCM being able to select one or more IP videophones for video decode and display, based on defined selection criteria; and
   decoding voice, on said first IP videophone, for remaining IP videophones in said plurality of IP videophones for which video is not being decoded and displayed.

24. The article as in claim 23, wherein the method further comprises providing an auto caller select module (ACSM) cooperating with said VNCM for performing the step of displaying.

25. The article as in claim 23, wherein said selection criteria in the method include a consideration of who is speaking at a given point in time.

26. The article as in claim 25, the method further comprising providing a video transmission control module (VTCM) in a transmitting IP videophone to effect selective non-transmission of video information to participants who are in voice-only mode, and providing a VNCM controller (VNCC) for selectively identifying connected IP videophones whose video signals have not been selected for decoding and display, and for providing to said VTCM a list of rejected endpoints not to be decoded.

27. The article as in claim 26, wherein the modules VNCM, VNCC, ACSM and VTCM comprise programmed software modules.

\* \* \* \* \*